(12) United States Patent
Miyazaki (10) Patent No.: US 8,583,308 B2
(45) Date of Patent: Nov. 12, 2013

(54) CONTROL DEVICE FOR VEHICLE

(75) Inventor: Kouji Miyazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 52 days.

(21) Appl. No.: 13/498,172

(22) PCT Filed: Sep. 28, 2009

(86) PCT No.: PCT/JP2009/066738
§ 371 (c)(1),
(2), (4) Date: Mar. 26, 2012

(87) PCT Pub. No.: WO2011/036785
PCT Pub. Date: Mar. 31, 2011

(65) Prior Publication Data
US 2012/0185120 A1    Jul. 19, 2012

(51) Int. Cl.
*B60L 11/00* (2006.01)
*B60W 20/00* (2006.01)

(52) U.S. Cl.
USPC .................... 701/22; 180/65.265; 180/65.285

(58) Field of Classification Search
USPC ............... 701/22; 180/65.265, 65.28, 65.285; 903/930
See application file for complete search history.

(56) References Cited

U.S. PATENT DOCUMENTS

| | | | |
|---|---|---|---|
| 7,468,565 B2 * | 12/2008 | Hoshiba | 307/10.1 |
| 8,274,174 B2 * | 9/2012 | Heger et al. | 307/9.1 |
| 2007/0205746 A1 | 9/2007 | Iida et al. | |
| 2008/0169776 A1 * | 7/2008 | Acker | 318/139 |
| 2011/0198920 A1 * | 8/2011 | Komuro et al. | 307/10.1 |
| 2012/0010771 A1 * | 1/2012 | Kato et al. | 701/22 |

FOREIGN PATENT DOCUMENTS

| | | |
|---|---|---|
| JP | 2001-327002 A | 11/2001 |
| JP | 2004-215361 A | 7/2004 |
| JP | 2004-215366 A | 7/2004 |
| JP | 2006-129557 A | 5/2006 |
| JP | 2006-217743 A | 8/2006 |
| JP | 2006-311640 A | 11/2006 |
| JP | 2006-311775 A | 11/2006 |
| JP | 2007-236151 A | 9/2007 |
| JP | 2008-195255 A | 8/2008 |

* cited by examiner

*Primary Examiner* — Khoi Tran
*Assistant Examiner* — Robert Nguyen
(74) *Attorney, Agent, or Firm* — Gifford, Krass, Sprinkle, Anderson & Citkowski, P.C.

(57) ABSTRACT

A control device for a vehicle includes a system control unit for putting the state of an electric power supply line into an interrupted state when a first condition on the state of the vehicle is satisfied, a battery ECU for, in parallel with the operation of the system control unit, detecting a state of charge of a battery for traveling and transmitting the detected state of charge to the system control unit and for putting the state of the electric power supply line into the interrupted state when a second condition on the state of the battery for traveling is satisfied, and a power supply interrupting unit for putting the state of the electric power supply line into the interrupted state with an SMR in response to a request from at least either one of the system control unit and the battery ECU.

6 Claims, 8 Drawing Sheets

CONTROL DEVICE FOR VEHICLE

CROSS-REFERENCE TO RELATED APPLICATIONS

This application is the U.S. National Phase of PCT/JP2009/066738 filed Sep. 28, 2009.

TECHNICAL FIELD

The present invention relates to control over a vehicle provided with a relay for switching the state of an electric power supply line between a rotating electric machine and a power storage device between a conducting state and an interrupted state, and particularly to power supply interruption control by a state of charge detecting unit detecting a state of charge of a power storage device.

BACKGROUND ART

In recent years, as one of the countermeasures against environmental problems, hybrid vehicles, fuel cell vehicles, electric vehicles and the like that travel using driving force from a motor have received attention. In such vehicles, a technique of exerting control to interrupt power supply when an abnormality occurs in the vehicle has been known.

For example, Japanese Patent Laying-Open No. 2008-195255 (PTL 1) discloses a power supply system for a vehicle which realizes a normal limp-home operation of a vehicle motion system even if an abnormality occurs in communication between a control device controlling a power supply system and a control device for the vehicle motion system receiving electric power from the power supply system. The power supply system of a vehicle includes a first control device, a second control device, and a signal line connecting the first control device and the second control device to each other. The first control device includes means for controlling establishing and interrupting of an electrical connection between a power storage mechanism and an electrical load which are installed on a vehicle based on an operation by a passenger of the vehicle, means for detecting an abnormality of the signal line, means for detecting an operation by the passenger of the vehicle requesting interruption of the electrical connection, and control means for controlling the electrical connection such that the electrical connection is not interrupted until a predetermined condition on the second control device is satisfied even if the operation requesting interruption is detected when the electrical connection between the power storage mechanism and the electrical load has been established and an abnormality of the signal line is detected. The second control device includes means for controlling the electrical load actuated by electric power supplied from the power storage mechanism, means for detecting an abnormality of the signal line, and means for detecting the operation by the passenger of the vehicle requesting interruption of the electrical connection.

According to the power supply system for a vehicle disclosed in the above-described publication, even if an interruption request operation by a driver is detected, the first control device exerts control such that the electrical connection will not be interrupted until the condition on the second control device is satisfied. This enables the second control device to perform a limp-home operation normally because electric power is supplied to the electrical load. As a result, a power supply system for a vehicle which can realize a normal limp-home operation of a vehicle motion system even if an abnormality occurs in communication between a first control device controlling a power supply system and a second control device for the vehicle motion system receiving electric power from the power supply system, can be provided.

CITATION LIST

Patent Literature

PTL 1: Japanese Patent Laying-Open No. 2008-195255

SUMMARY OF INVENTION

Technical Problem

However, in a case where control to interrupt power supply is performed by a particular control unit implemented by software, there is a problem that a malfunction occurred in executing the software prevents power supply from being interrupted promptly. For this reason, there is a possibility that interruption of power supply cannot be achieved when, for example, the power storage device has an abnormality. The power supply system for a vehicle disclosed in the above-indicated publication gives no consideration to such a problem and cannot solve the problem.

An object of the present invention is to provide a control device for a vehicle capable of promptly interrupting power supply when a power storage device has an abnormality.

Solution to Problem

A control device for a vehicle according to an aspect of the present invention is a control device for a vehicle that includes a rotating electric machine, a power storage device for supplying electric power to the rotating electric machine, and a relay for switching a state of an electric power supply line connecting the power storage device and the rotating electric machine to each other between a conducting state and an interrupted state. The control device for a vehicle includes a vehicle control unit for putting the state of the electric power supply line into the interrupted state when a first condition on a state of the vehicle is satisfied; a state of charge detecting unit for, in parallel with an operation of the vehicle control unit, detecting a state of charge of the power storage device and transmitting the detected state of charge to the vehicle control unit and for putting the state of the electric power supply line into the interrupted state when a second condition on the state of the power storage device is satisfied; and a power supply interrupting unit for putting the state of the electric power supply line into the interrupted state with the relay in response to a request from at least either one of the state of charge detecting unit and the vehicle control unit.

Preferably, the second condition is a condition that an abnormality occurs in the power storage device.

More preferably, the state of charge detecting unit requests that the state of the electric power supply line be put into the interrupted state after standby time has elapsed since the state of the electric power supply line was switched by the relay from the interrupted state to the conducting state when the second condition is satisfied during startup of the vehicle.

More preferably, the vehicle further includes an internal combustion engine installed as a motive power source. The vehicle control unit starts the internal combustion engine after controlling the relay such that the state of the electric power supply line switches from the interrupted state to the conducting state when the first condition is satisfied during startup of the vehicle. The predetermined period of time is a period of time from a switch of the state of the electric power supply line to the conducting state to completion of starting the internal combustion engine.

More preferably, the control device for a vehicle further includes a current detecting unit for detecting current in the electric power supply line. The state of charge detecting unit determines that the state of the electric power supply line is switched by the relay to the conducting state when current detected by the current detecting unit exceeds a threshold value during startup of the vehicle.

More preferably, the relay is driven upon receipt of an instruction signal from the power supply interrupting unit. The state of charge detecting unit determines that the state of the electric power supply line is switched by the relay to the conducting state when the instruction signal indicates putting the state of the electric power supply line into the conducting state during startup of the vehicle.

More preferably, the vehicle is provided with an operation unit for starting up a system of the vehicle. The vehicle control unit initiates a startup process of the system of the vehicle in response to an operation of the operation unit by a driver. The state of charge detecting unit determines that the state of the electric power supply line is switched by the relay to the conducting state when determination time has elapsed since the vehicle control unit initiated the startup process.

More preferably, the vehicle is provided with an operation unit for starting up a system of the vehicle. The vehicle control unit initiates a startup process of the system of the vehicle in response to an operation of the operation unit by a driver. The state of charge detecting unit determines that the state of the electric power supply line is switched by the relay to the conducting state when the startup process is completed.

Advantageous Effects of Invention

According to the present invention, the state of the electric power supply line can be put into the interrupted state in accordance with a request from the state of charge detecting unit for detecting a state of charge of the power storage device. Thus, in a case where the vehicle control unit is implemented by software and even if a malfunction occurs during execution of control by the software, power supply can be directly interrupted in accordance with a request from the state of charge detecting unit. Therefore, a control device for a vehicle capable of quickly interrupting power supply when a power storage device has an abnormality can be provided.

DESCRIPTION OF EMBODIMENTS

An embodiment of the present invention will be described hereinafter with reference to the drawings. In the following description, the same components have the same reference characters allotted. Their names and functions are also the same. Therefore, a detailed description thereof will not be repeated.

Figure 1:
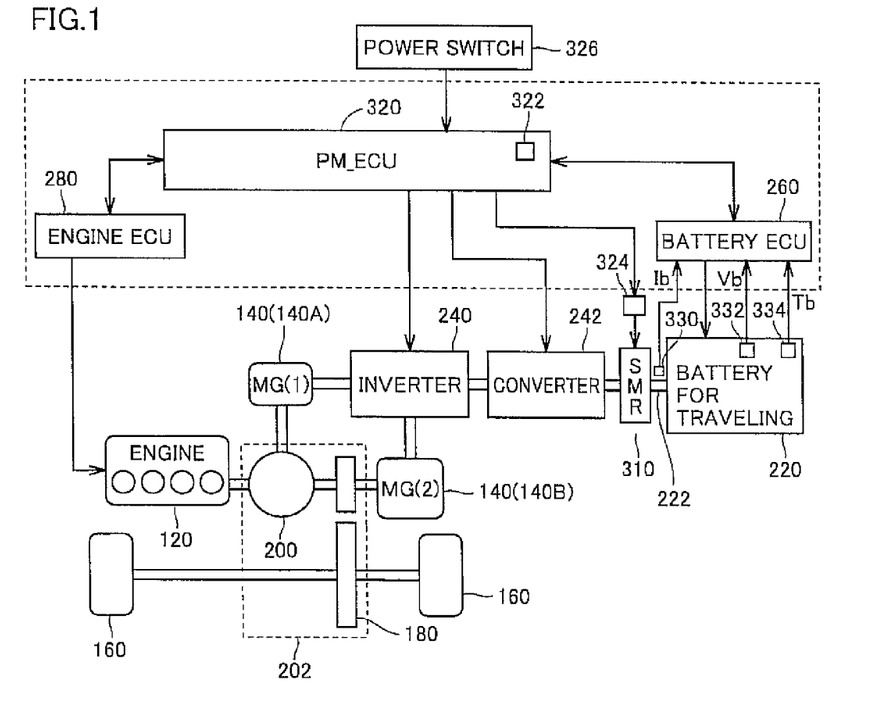
FIG. 1 is a control block diagram showing a configuration of a hybrid vehicle.

Referring to FIG. 1, a control block diagram of a hybrid vehicle equipped with a control device for a vehicle according to the present embodiment will be described. The vehicle equipped with the control device for a vehicle according to the present embodiment may be any vehicle powered by a rotating electric machine, and is not particularly limited to a hybrid vehicle. For example, the vehicle may be an electric vehicle or may be a fuel cell vehicle.

The hybrid vehicle may be any vehicle that can travel by motive power from a motor generator serving as a motive power source with an internal combustion engine stopped. Thus, the hybrid vehicle is not limited to have the configuration of a hybrid vehicle shown in FIG. 1, and may be a hybrid vehicle equipped with a secondary battery as a battery for traveling and having a different mode.

The hybrid vehicle includes an internal combustion engine (hereinafter referred to as engine) 120 serving as a drive source, a motor generator (MG) 140 serving as a rotating electric machine, and a transmission 202 connected to each of engine 120 and motor generator 140.

It is noted that although motor generator 140 is represented as a generator 140A and a motor 140B in FIG. 1 for the convenience of description, generator 140A may function as a motor, or motor 140B may function as a generator depending on the traveling state of the hybrid vehicle. When motor generator 140 functions as a generator, regenerative braking is performed. When motor generator 140 functions as a generator, the kinetic energy of the vehicle is converted into electrical energy, to reduce the speed of the vehicle.

Transmission 202 includes a speed reducer 180 and a motive power split mechanism 200. Speed reducer 180 transfers motive power generated at engine 120 and/or motor generator 140 to wheels 160 or transfers drive of wheels 160 to engine 120 and/or motor generator 140.

Motive power split mechanism 200 is, for example, a planetary gear mechanism for dividing motive power of engine 120 into two paths, that is, wheels 160 (i.e. motor 140B) and generator 140A. The planetary gear mechanism includes a sun gear, a ring gear, a carrier, and a pinion gear. For example, the sun gear of the planetary gear mechanism is connected to generator 140A, the carrier is connected to engine 120, the ring gear is connected to motor 140B. It is noted that a transmission mechanism may be provided between the ring gear and motor 140B. By controlling the rotation speed of generator 140A, motive power split mechanism 200 also functions as a continuously variable transmission.

Further, the hybrid vehicle further includes a battery for traveling 220, an inverter 240, and a system main relay (hereinafter referred to as SMR) 310.

Battery for traveling 220 is a power storage device storing electric power for driving motor generator 140. Battery for traveling 220 outputs DC power. In the present embodiment, battery for traveling 220 is a rechargeable secondary battery and formed of, for example, a nickel-metal hydride battery or a lithium ion battery. It is noted that not only those mentioned above but one that can generate a DC voltage, for example, a capacitor, a solar cell, a fuel cell, or the like is also applicable.

Inverter 240 converts DC power of battery for traveling 220 into AC power of generator 140A and motor 140B. Inverter 240 receives DC power from battery for traveling 220 on an input side, converts the received power into AC power corresponding to a frequency command value, and outputs the converted power to generator 140A and motor 140B.

SMR 310 is provided on a point on an electric power supply line 222 connecting battery for traveling 220 and a converter 242 together. SMR 310 switches an electric power supply state of electric power supply line 222 between a conducting state and an interrupted state. Specifically, SMR 310 closes a contact to put electric power supply line 222 into an electrically conducting state or opens the contact to put electric power supply line 222 into an electrically interrupted state, in response to a control signal from a PM-ECU 320. When electric power supply line 222 is in the electrically conducting state, electric power of battery for traveling 220 is supplied via converter 242 and inverter 240 to motor generator 140. On the other hand, when electric power supply line 222 is in the electrically interrupted state, no electric power of battery for traveling 220 is supplied to motor generator 140.

Further, the hybrid vehicle further includes a battery ECU 260, an engine ECU 280, PM-ECU 320, an SMR driving unit 324, a power switch 326, a current sensor 330, a voltage sensor 332, and a temperature sensor 334. PM-ECU 320 has a memory 322 temporary storing a program executed in PM-ECU 320 and/or an instruction signal for SMR driving unit 324. SMR driving unit 324 will be described later.

Current sensor 330, voltage sensor 332, and temperature sensor 334 are connected to battery ECU 260. Current sensor 330 detects current in electric power supply line 222. Current sensor 330 transmits a signal indicating the detected current in electric power supply line 222 to battery ECU 260. Voltage sensor 332 detects the voltage of battery for traveling 220. Voltage sensor 332 transmits a signal indicating the detected voltage of battery for traveling 220 to battery ECU 260. Temperature sensor 334 detects the temperature of battery for traveling 220. Temperature sensor 334 transmits a signal indicating the detected temperature of battery for traveling 220 to battery ECU 260.

Based on the voltage, current, and temperature of battery for traveling 220, battery ECU 260 manages and controls a state of charge and discharge of battery for traveling 220, controls drive of a cooling fan (not shown) provided at battery for traveling 220, executes control to achieve equal states of charge between a plurality of modules or cells making up battery for traveling 220, or determines whether or not battery for traveling 220 has an abnormality.

Engine ECU 280 controls the operation of engine 120. PM-ECU 320 mutually controls battery ECU 260, engine ECU 280, and the like to control the whole hybrid system such that the hybrid vehicle can travel most efficiently.

For example, PM-ECU 320 controls motor generator 140, inverter 240, converter 242 and the like according to the state of the hybrid vehicle and information on the state of charge of battery for traveling 220 received from battery ECU 260.

In the present embodiment, converter 242 is provided between battery for traveling 220 and inverter 240. The rated voltage of battery for traveling 220 is lower than the rated voltages of generator 140A and motor 140B. Thus, converter 242 boosts the voltage of battery for traveling 220 to supply electric power to generator 140A and motor 140B.

It is noted that although the ECUs are provided separately in FIG. 1, two or more ECUs may be integrated into an ECU (examples of this include an ECU having battery ECU 260, engine ECU 280, and PM-ECU 320 integrated therein, as shown by a dotted line in FIG. 1).

PM-ECU 320 calculates driving force requested to the vehicle corresponding to an amount of depression of an accelerator pedal. According to the requested drive force corresponding to the amount of depression of the accelerator pedal, PM-ECU 320 controls output of engine 120 using engine ECU 280. Further, according to the requested driving force corresponding to the amount of depression, PM-ECU 320 controls an amount of electricity generated by generator 140A and motor 140B.

In the hybrid vehicle equipped with the hybrid system as shown in FIG. 1, the hybrid vehicle travels using only motor 140B of motor generator 140 when engine 120 operates with low efficiency at the start of driving, during low speed traveling, or the like. During normal traveling, for example, motive power split mechanism 200 divides the motive power of engine 120 into the two paths, that is, one for motor 140B to directly drive wheels 160 and the other for generator 140A to generate electric power. At this time, the generated electric power drives motor 140B to assist driving wheels 160. During high speed traveling, electric power from battery for traveling 220 is further supplied to motor 140B to increase an output of motor 140B, so that additional driving force is given to wheels 160.

On the other hand, during deceleration, motor 140B, which rotates following wheels 160, functions as a generator (that is, motor 140B generates driving force in the negative direction) to perform regeneration, and recovered electric power is stored in battery for traveling 220.

It is noted that when battery for traveling 220 has a reduced amount of charge and particularly needs to be charged, the output of engine 120 is increased to increase the amount of electric power generated by generator 140A, thereby to increase the amount of charge to battery for traveling 220.

Control to increase the driving amount of engine 120 is performed as necessary even during low speed traveling. For example, in the cases where battery for traveling 220 needs to be charged as described above, where auxiliary equipment such as an air conditioner is driven, where the temperature of the cooling water for engine 120 is raised to a predetermined temperature, and the like.

Figure 2:
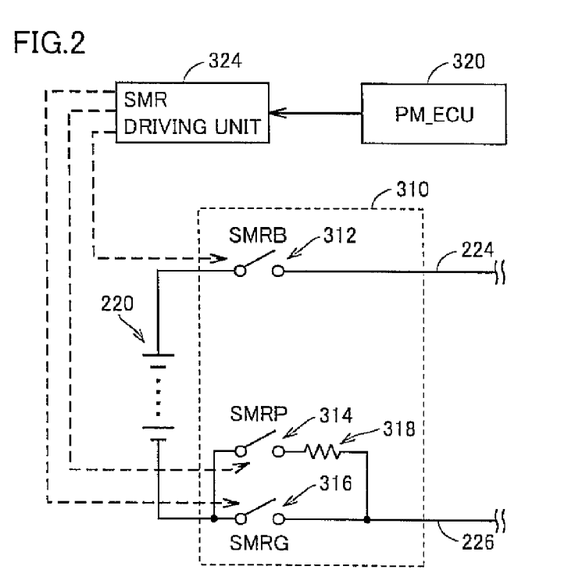
FIG. 2 shows a configuration of an SMR.

As shown in FIG. 2, SMR 310 includes an SMRB 312, an SMRP 314, and an SMRG 316. Electric power supply line 222 includes a power supply line 224 and an earth line 226.

On end of power supply line 224 is connected to a + terminal of battery for traveling 220. One end of earth line 226 is connected to a − line of battery for traveling 220. The other end of power supply line 224 and the other end of earth line 226 are connected to converter 242. A condenser is connected in parallel with battery for traveling 220. The condenser is provided at a position between SMR 310 and converter 242.

SMRB 312 is provided on a point on power supply line 224. SMRB 312 has a contact that is opened (turned off) or closed (turned on) by SMR driving unit 324. Closing the contact of SMRB 312 brings the state of power supply line 224 into the electrically conducting state. Opening the contact of SMRB 312 brings the state of power supply line 224 into the electrically interrupted state.

SMRG 316 is provided on a point on earth line 226. SMRG 316 has a contact that is opened or closed by SMR driving unit 324. Closing the contact of SMRG 316 brings earth line 226 routed through SMRG 316 into the electrically conducting state. Opening the contact of SMRG 316 brings the state of earth line 226 routed through SMRG 316 into the electrically interrupted state.

A resistor 318 is connected in series to SMRP 314. SMRP 314 and resistor 318 are connected in parallel with SMRG 316. SMRP 314 has a contact that is opened or closed by SMR driving unit 324. Closing the contact of SMRP 314 brings earth line 226 routed through SMRP 314 into the electrically conducting state. Opening the contact of SMRG 316 brings earth line 226 routed through SMRP 314 into the electrically interrupted state.

PM-ECU 320 instructs SMR driving unit 324 on on/off of each of SMRB 312, SMRP 314, and SMRG 316. For example, when turning SMR 310 off, PM-ECU 320 transmits, to SMR driving unit 324, an SMRB instruction signal containing an instruction to turn SMRB 312 off, an SMRP instruction signal containing an instruction to turn SMRP 314 off, and an SMRG instruction signal containing an instruction to turn SMRG 316 off.

Receiving the above-described SMRB instruction signal, SMRP instruction signal, and SMRG instruction signal, SMR driving unit 324 opens each of the contacts of SMRB 312, SMRP 314, and SMRG 316.

When turning SMR 310 on, PM-ECU 320 transmits, to SMR driving unit 324, the SMRB instruction signal containing an instruction to turn SMRB 312 on and the SMRP instruction signal containing an instruction to turn SMRP 314 on or the SMRG instruction signal containing an instruction to turn SMRG 316 on.

Receiving the above-described SMRB instruction signal and SMRP instruction signal, SMR driving unit 324 closes each of the contacts of SMRB 312 and SMRP 314. Alternatively, receiving the above-described SMRB instruction signal and SMRG instruction signal, SMR driving unit 324 closes each of the contacts of SMRB 312 and SMRG 316.

In the present embodiment, PM-ECU 320 turns each of SMRB 312 and SMRP 314 on, and subsequently turns SMRP 314 off and SMRG 316 on.

In the hybrid vehicle having such a configuration, the present embodiment is characterized by including, as a control device for a vehicle, a vehicle control unit for putting the state of electric power supply line 222 into the interrupted state when a first condition on the state of the vehicle is satisfied; a state of charge detecting unit for, in parallel with an operation of the vehicle control unit, detecting a state of charge of battery for traveling 220 and transmitting the detected state of charge to the vehicle control unit and for putting the state of electric power supply line 222 into the interrupted state when a second condition on the state of battery for traveling 220 is satisfied; and a power supply interrupting unit for putting the state of electric power supply line 222 into the interrupted state with SMR 310 in response to a request from at least either one of the vehicle control unit and the state of charge detecting unit.

Figure 3:
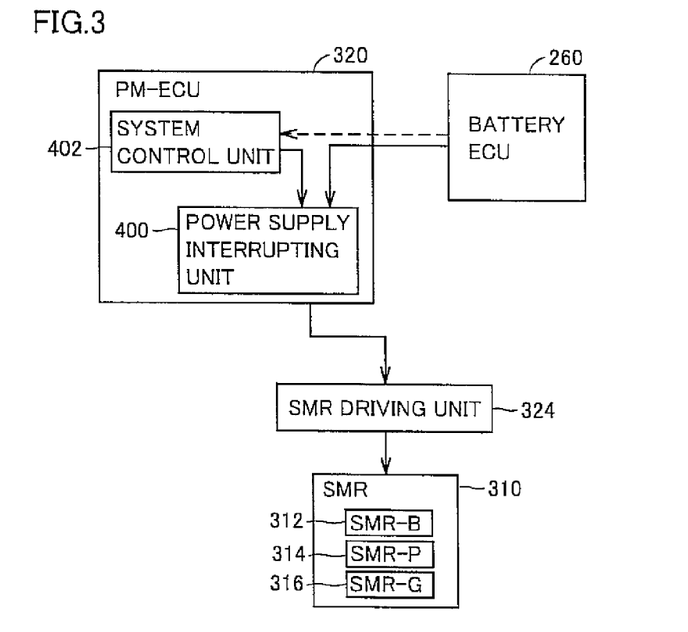
FIG. 3 shows configurations of a PM-ECU and a battery ECU.

In the present embodiment, as shown in FIG. 3, PM-ECU 320 includes a power supply interrupting unit 400 and a system control unit 402. In the present embodiment, "state of charge detecting unit" corresponds to battery ECU 260. "Vehicle control unit" corresponds to system control unit 402. "Power supply interrupting unit" corresponds to power supply interrupting unit 400. "First condition" is, for example, a condition that an instruction to turn SMR 310 off is received as a result of an off operation by a driver on power switch 326. It is noted that "first condition" is not particularly limited to the above, and may be, for example, a condition that a collision signal indicating a collision of the vehicle is received from a collision detection sensor or an air bag ECU (both not shown), a condition that an interlock switch is actuated as a result of removal of the top lid of a power control unit including an inverter and the like, or a condition that an abnormality has occurred in a system of the vehicle. "Second condition" is a condition that the state of charge of battery for traveling 220 has an abnormality.

Battery ECU 260 transmits a first SMR-OFF request signal to power supply interrupting unit 400 when battery for traveling 220 has an abnormality. It is noted that with the transmission of the first SMR-OFF request signal to power supply interrupting unit 400, battery ECU 260 transmits information that battery for traveling 220 has an abnormality, to system control unit 402 as indicated by a dashed arrow in FIG. 3.

Battery ECU 260 may determine that battery for traveling 220 has an abnormality, for example, when a state in which current Ib in electric power supply line 222 is larger than a predetermined value, continues for a predetermined period of time or longer.

Alternatively, battery ECU 260 may determine that battery for traveling 220 has an abnormality when battery for traveling 220 is in a state of being unable to supply necessary electric power due to degradation and the like. Battery ECU 260 may determine battery for traveling 220 has an abnormality, for example, when an estimated value of the full-charge capacity of battery for traveling 220 is not more than a predetermined value. The estimated value of the full-charge capacity can just be calculated based on, for example, current Ib, a voltage Vb, temperature Tb, or an electric power input Win/output Wout to/from battery for traveling 220.

System control unit 402 transmits a second SMR-OFF request signal to power supply interrupting unit 400 when a driver performs an off operation of power switch 326. It is noted that receiving the information that battery for traveling 220 has an abnormality from battery ECU 260 as indicated by a dashed arrow in FIG. 3, system control unit 402 may transmit the second SMR-OFF request signal to power supply interrupting unit 400.

Receiving at least either one of the first SMR-OFF request signal from battery ECU 260 and the second SMR-OFF request signal from system control unit 402, power supply interrupting unit 400 transmits a signal instructing to turn SMR 310 off, to SMR driving unit 324. That is, power supply interrupting unit 400 transmits, to SMR driving unit 324, the SMRB instruction signal containing an instruction to turn SMRB 312 off, the SMRP instruction signal containing an instruction to turn SMRP 314 off, and the SMRG instruction signal containing an instruction to turn SMRG 316 off.

Figure 4:
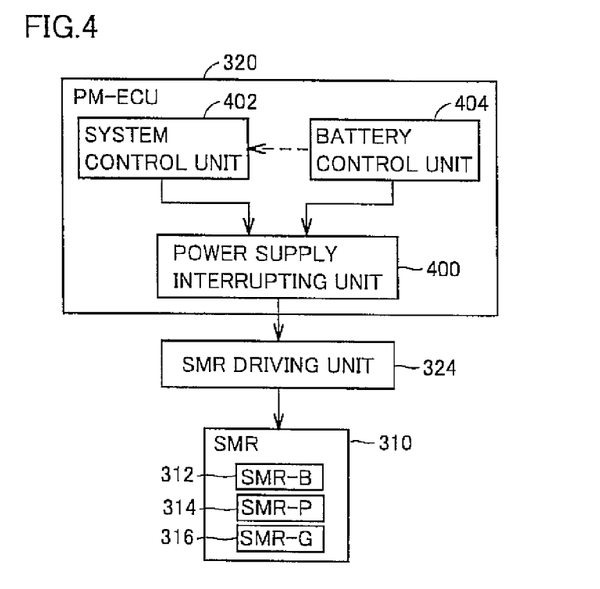
FIG. 4 shows a configuration of a PM-ECU incorporating functions of a battery ECU.

It is noted that although battery ECU 260 is describes as an ECU provided separately from PM-ECU 320 in the present embodiment as shown in FIG. 3, the functions of battery ECU 260 may be integrated into PM-ECU 320 as described above. In this case, as shown in FIG. 4, PM-ECU 320 further includes a battery control unit 404 in addition to power supply interrupting unit 400 and system control unit 402. Battery control unit 404 has the same functions as those of battery ECU 260. Therefore, a detailed description thereof will not be repeated.

Receiving information that battery for traveling 220 has an abnormality from battery ECU 260 during startup of the vehicle, system control unit 402 executes control for starting engine 120. Because engine 120 is started by drive from generator 140A, in order to start engine 120, system control unit 402 turns SMR 310 on to start up the vehicle and then use generator 140A to start engine 120.

Figure 5:
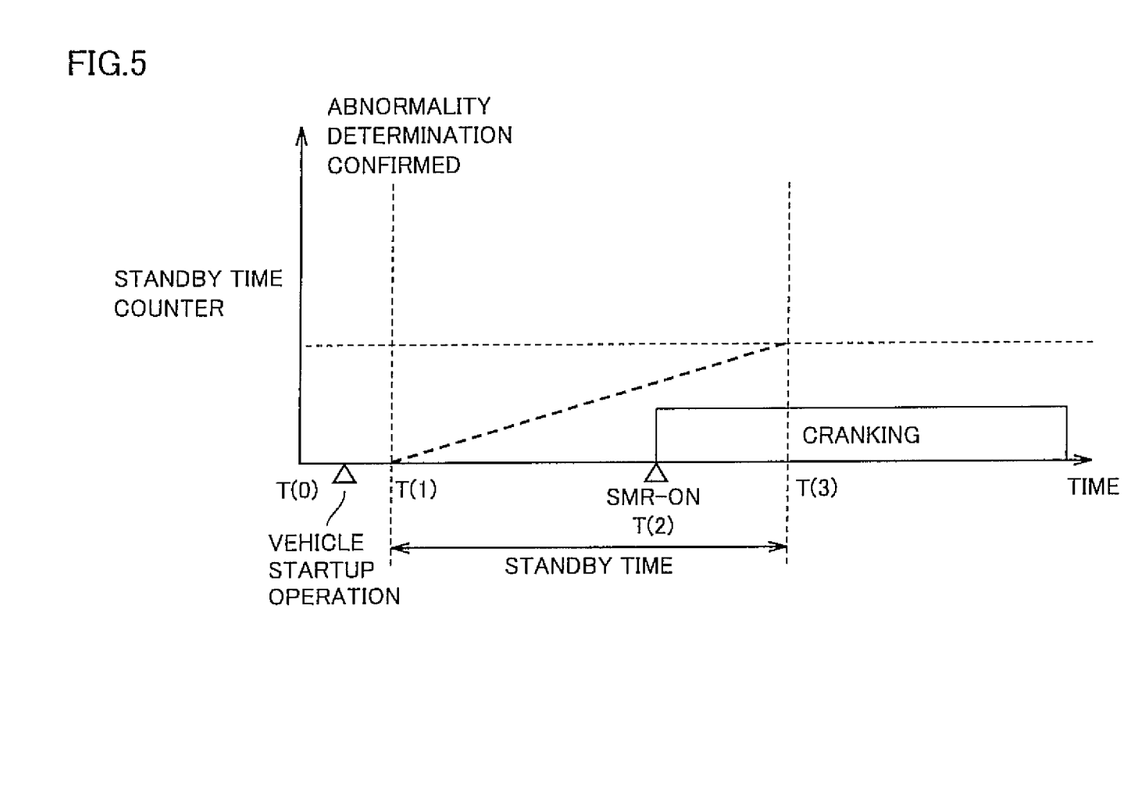
FIG. 5 illustrates a problem caused by an SMR-OFF instruction after determination of an abnormality and execution of cranking.

For this reason, as shown in FIG. 5, when an abnormality in battery for traveling 220 is confirmed at time T(1), then SMR 310 is turned on at time T(2), and thereafter, an engine start is initiated.

However, if the first SMR-OFF request signal is transmitted from battery ECU 260 to power supply interrupting unit 400 at time T(3), which is after standby time has elapsed since the abnormality in battery for traveling 220 was confirmed, SMR 310 is turned off during cranking of engine 120. As a result, drive from generator 140A stops during cranking, and therefore, engine 120 may be unable to be started.

Therefore, in the present embodiment, determining that battery for traveling 220 has an abnormality at startup of the vehicle, battery ECU 260 transmits the first off request signal to PM-ECU 320 after standby time has elapsed since SMR 310 was determined to be turned on.

Figure 6:
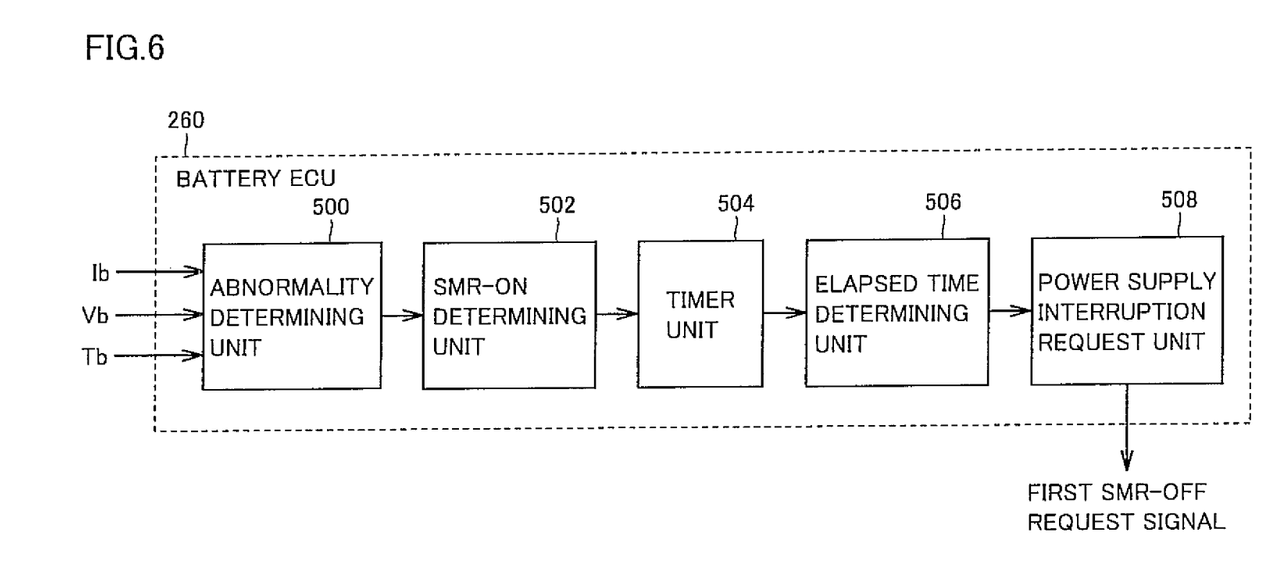
FIG. 6 is a functional block diagram of the battery ECU.

A functional block diagram of battery ECU 260 in the present embodiment is shown in FIG. 6. Battery ECU 260 includes an abnormality determining unit 500, an SMR-ON determining unit 502, a timer unit 504, an elapsed time determining unit 506, and a power supply interruption request unit 508.

Abnormality determining unit 500 determines whether or not battery for traveling 220 has an abnormality based on current Ib, voltage Vb, and temperature Tb. It is noted that the method of determining whether or not battery for traveling 220 has an abnormality is as described above, and therefore, a detailed description thereof will not be repeated. It is noted that determining that battery for traveling 220 has an abnormality, abnormality determining unit 500 may, for example, set an abnormality determination flag on.

When abnormality determining unit 500 determines that battery for traveling 220 has an abnormality, SMR-ON determining unit 502 determines whether or not SMR 310 is turned on. It is noted that SMR-ON determining unit 502 may set an SMR-ON determination flag on when SMR 310 is turned on.

Figure 7:
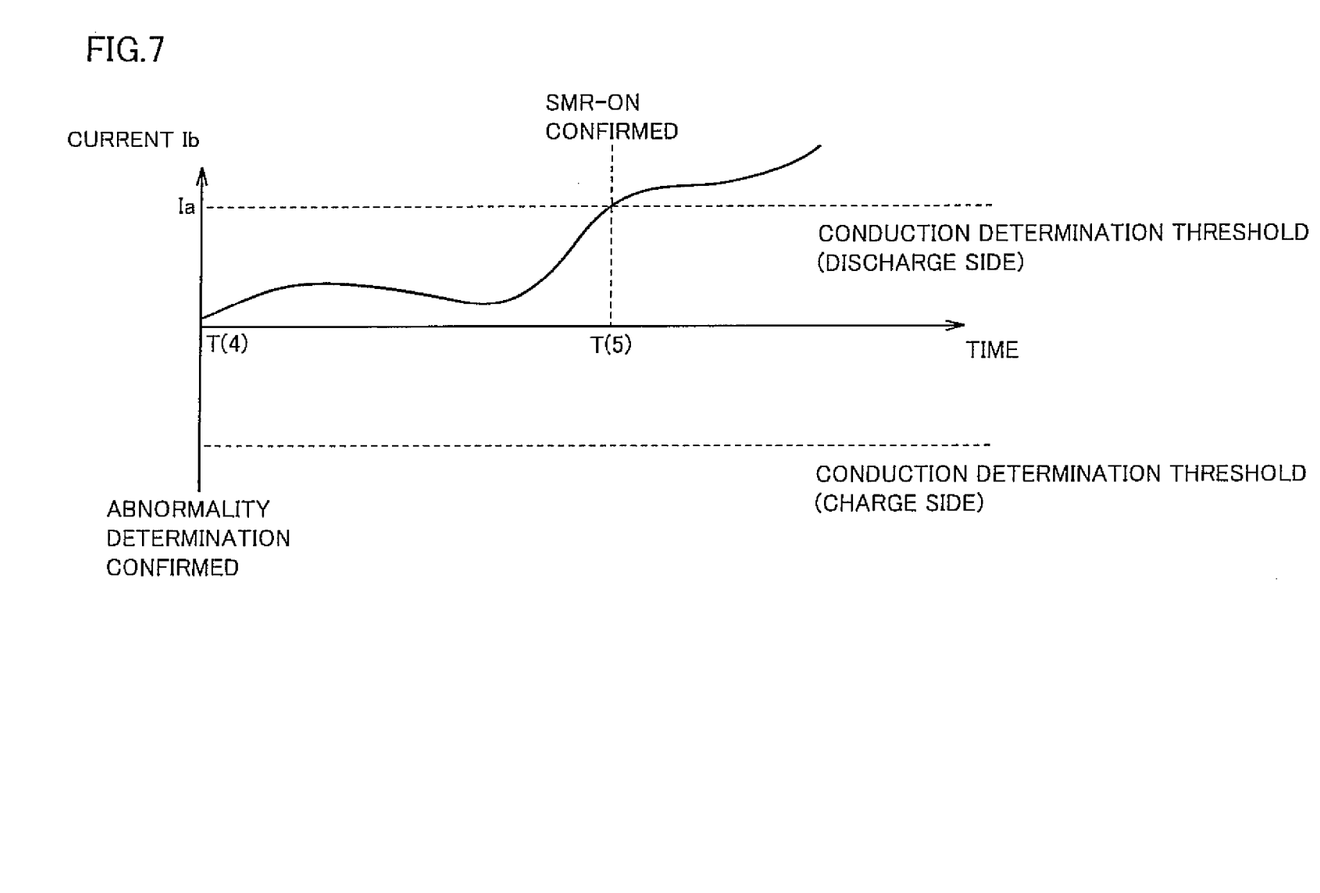
FIG. 7 is a timing chart showing variations in current in an electric power supply line during startup of a vehicle.

For example, SMR-ON determining unit 502 determines that SMR 310 is turned on when current Ib in electric power supply line 222 exceeds a threshold value Ia. FIG. 7 shows variations in current Ib of battery for traveling after startup of the vehicle. As shown in FIG. 7, when it is determined at time T(4) that battery for traveling 220 has an abnormality, SMR-ON determining unit 502 determines at time T(5) that SMR 310 is turned on at a point where current Ib exceeds threshold value Ia.

Further, SMR-ON determining unit 502 determines that SMR 310 is turned on when a signal instructing to turn SMRB 312 and SMRP 314 on or a signal instructing to turn SMRB 312 and SMRG 316 on is transmitted from power supply interrupting unit 400 to SMR driving unit 324.

For example, SMR-ON determining unit 502 may determine SMR 310 is turned on with reference to an instruction value of each of the SMRB instruction signal, the SMRP instruction signal, and the SMRG instruction signal which are stored in memory 322 of PM-ECU 320, when a signal instructing to turn SMRB 312 and SMRP 314 on or a signal instructing to turn SMRB 312 and SMRG 316 on is transmitted from power supply interrupting unit 400 to SMR driving unit 324.

Still further, SMR-ON determining unit 502 determines that SMR 310 is turned on when determination time (hereinafter described as STON elapsed time) has elapsed since a startup process of the vehicle was initiated. The STON elapsed time is a predicted period of time from the initiation of the startup operation of the vehicle to definite turn-on of SMR 310, to which an experimental or design adjustment is made.

Figure 8:
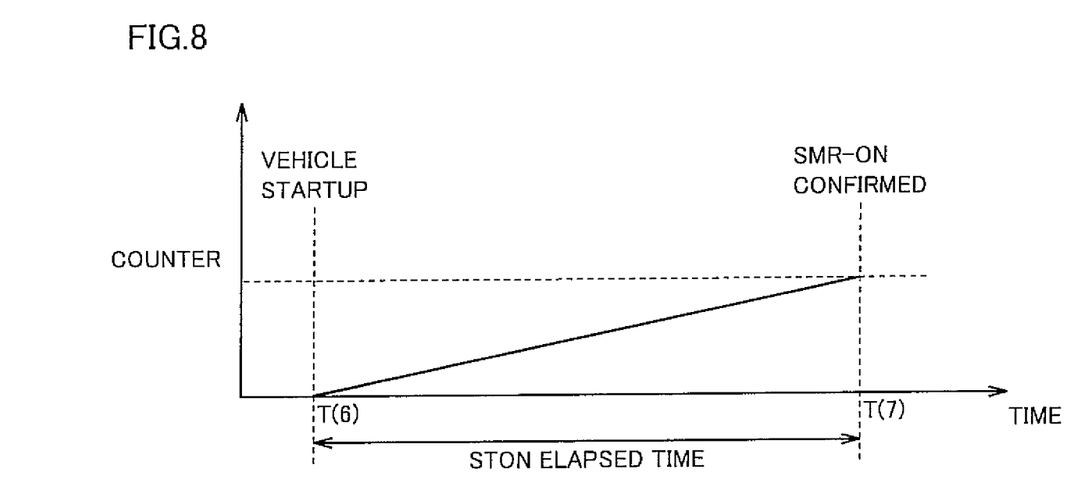
FIG. 8 is a timing chart showing variations in a value counted by an elapsed time counter after startup of the vehicle.

As shown in FIG. 8, when a startup operation of the vehicle is initiated at time T(6), SMR-ON determining unit 502 initiates counting of elapsed time from the initiation of the startup operation of the vehicle. At time T(7), SMR-ON determining unit 502 determines that SMR 310 is turned on when elapsed time from the initiation of the startup operation of the vehicle is not less than the STON elapsed time.

Further yet, SMR-ON determining unit 502 determines that SMR 310 is turned on when system control unit 402 sets a Ready-ON flag on. It is noted that system control unit 402 executes a startup process of the system of the vehicle when a driver turns power switch 326 on, and sets the Ready-On flag on when the startup process is completed.

Timer unit 504 initiate measurement of time elapsed since SMR 310 was turned on when battery for traveling 220 is determined to have an abnormality and it is determined that SMR 310 is turned on. It is noted that timer unit 504 may initiate measurement of elapsed time when, for example, the abnormality determination flag and the SMR-ON determination flag are both set on. Timer unit 504 may measure the STON elapsed time described above.

Elapsed time determining unit 506 determines whether or not time elapsed since SMR 310 was turned on is equal to or longer than standby time. It is noted that elapsed time determining unit 506 may set an elapse determination flag on when time elapsed since SMR 310 was turned on is equal to or longer than standby time. Although standby time is described in the present embodiment as a predetermined period of time, it may be any period of time from turn-on of SMR 310 to completion of cranking and may be, for example, a period of time variable depending on the state of the vehicle or battery for traveling 220.

Power supply interruption request unit 508 transmits the first SMR-OFF request signal to power supply interrupting unit 400 of PM-ECU 320 when time elapsed since SMR 310 was turned on is equal to or longer than standby time.

In the present embodiment, abnormality determining unit 500, SMR-ON determining unit 502, timer unit 504, elapsed time determining unit 506, and power supply interruption request unit 508 are each described as functioning as software implemented by a CPU of battery ECU 260 executing a program stored in the memory. They may, however, be implemented by hardware. It is noted that such a program is recorded in a storage medium and mounted on the vehicle.

Figure 9:
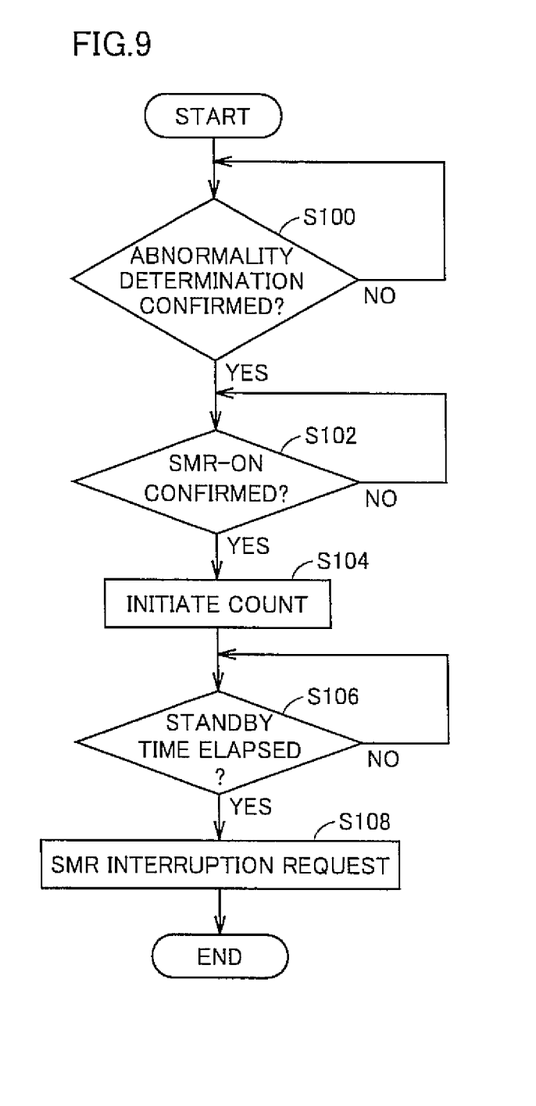
FIG. 9 is a flowchart showing a control structure of a program executed in the battery ECU.

Referring to FIG. 9, a control structure of a program executed by battery ECU 260 in the present embodiment will be described.

In step (hereinafter denoted as S) 100, battery ECU 260 determines whether or not battery for traveling 220 has an abnormality. If it is determined that battery for traveling 220 has an abnormality (YES in S100), then the process proceeds to S102. If not (NO in S100), then the process returns to S100 and stands by until it is determined that battery for traveling 220 has an abnormality.

In S102, battery ECU 260 determines whether or not SMR 310 is turned on. If SMR 310 is turned on (YES in S102), then the process proceeds to S104. If not (NO in S102), then the process returns to S102 and stands by until SMR 310 is turned on. It is noted that the method of determining whether or not SMR 310 is turned on is as described above, and therefore, a detailed description thereof will not be repeated.

In S104, battery ECU 260 initiates measurement of time elapsed since SMR 310 was determined to be turned on. In S106, battery ECU 260 determines whether or not measured elapsed time is equal to or longer than standby time. If elapsed time is equal to or longer than standby time (YES in S106), then the process proceeds to S108. If not (NO in S106), then the process returns to S106 and stands by until elapsed time becomes equal to or longer than standby time.

In S108, battery ECU 260 transmits the first SMR-OFF request signal to PM-ECU 320.

Figure 10:
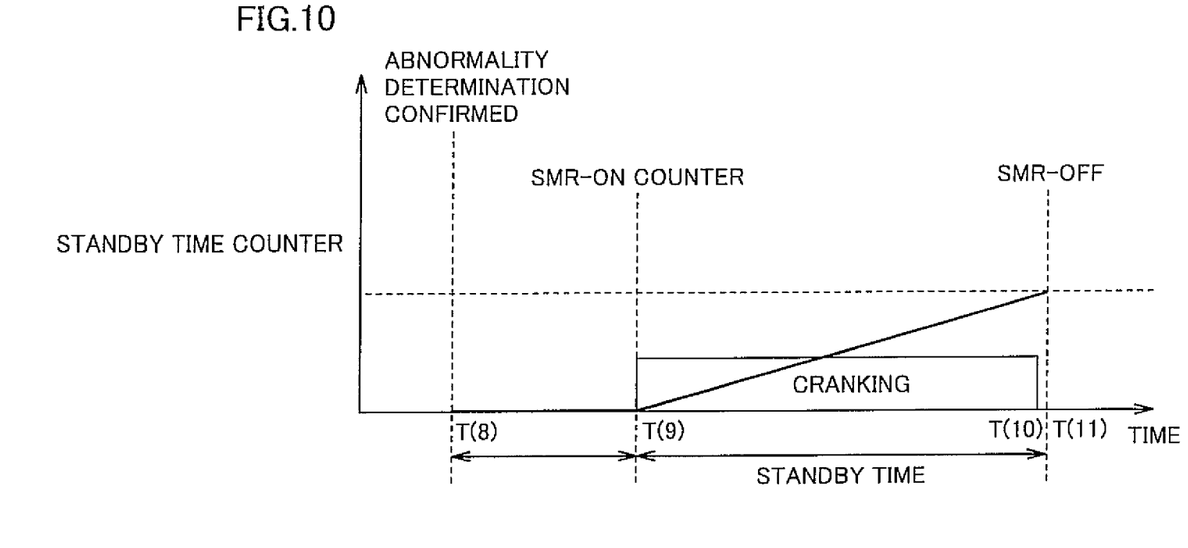
FIG. 10 is a timing chart showing a relation between an SMR-OFF instruction after determination of an abnormality and a period for execution of cranking.

Based on the structure and flowchart as above, operation of battery ECU 260 in the present embodiment will be described using FIG. 10.

During startup of the vehicle caused by, for example, a push on power switch 326 by a driver, if it is determined at time T(8) that battery for traveling 220 has an abnormality (YES in S100) and it is determined at time T(9) that SMR 310 is turned on (YES in S102), then measurement of elapsed time is initiated (S104). Turning SMR 310 on causes cranking of engine 120 to be initiated using generator 140A.

At time T(10), completion of cranking engine 120 causes engine 120 to start. At time T(11), if time elapsed since SMR 310 was turned on is equal to or longer than standby time (YES in S106), then the first SMR-OFF request signal is transmitted from battery ECU 260 to power supply interrupting unit 400 (S108) to turn SMR 310 off.

As such, the control device for a vehicle according to the present embodiment can cause the SMR to be turned off by the battery ECU for detecting the state of charge of the battery for traveling. Thus, in a case where the system control unit is implemented by software and even if a malfunction occurs during execution of the software (that is, even if the system control unit is in an inoperable state), the battery ECU can directly interrupt power supply. Therefore, a control device for a vehicle capable of quickly interrupting power supply when there is an abnormality in a state of charge of a power storage device can be provided.

Further, when it is determined that the battery for traveling has an abnormality during startup of the vehicle, the battery ECU can turn the SMR off after an engine start is completed, by turning the SMR off after standby time has elapsed since the SMR was turned on. Therefore, it is possible to ensure that the engine is started even if it is determined that the battery for traveling has an abnormality. Further, by turning the SMR off after the engine is started, impacts of the abnormality of the battery for traveling on the operation of the vehicle can be suppressed.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

120 engine; 140 motor generator; 140A motor; 140B generator; 160 wheel; 180 speed reducer; 200 motive power split mechanism; 202 transmission; 220 battery for traveling; 222 electric power supply line; 224 power supply line; 226 earth line; 232 condenser; 240 inverter; 242 converter; 260 battery ECU; 280 engine ECU; 318 resistor; 320 PM-ECU; 322 memory; 324 SMR driving unit; 330 current sensor; 332 voltage sensor; 334 temperature sensor; 400 power supply interrupting unit; 402 system control unit; 404 battery control; 500 abnormality determining unit; 502 on determining unit; 504 timer unit; 506 elapsed time determining unit; 508 power supply interruption request unit.

The invention claimed is:

1. A control device for a vehicle, said vehicle including a rotating electric machine, a power storage device for supplying electric power to said rotating electric machine, and a relay for switching a state of an electric power supply line connecting said power storage device and said rotating electric machine to each other between a conducting state and an interrupted state, said control device comprising:

a vehicle control unit for putting the state of said electric power supply line into said interrupted state when a first condition on a state of said vehicle is satisfied;

a state of charge detecting unit for, in parallel with an operation of said vehicle control unit, detecting a state of charge of said power storage device and transmitting detected said state of charge to said vehicle control unit and for putting the state of said electric power supply line into said interrupted state when a second condition on the state of said power storage device is satisfied; and a power supply interrupting unit for putting the state of said electric power supply line into said interrupted state with said relay in response to a request from at least either one of said state of charge detecting unit and said vehicle control unit, said second condition is a condition that an abnormality occurs in said power storage device, and said state of charge detecting unit requests that the state of said electric power supply line be put into said interrupted state after standby time has elapsed since the state of said electric power supply line was switched by said relay from said interrupted state to said conducting state when said second condition is satisfied during startup of said vehicle.

2. The control device for a vehicle according to claim 1, wherein said vehicle further includes an internal combustion engine installed as a motive power source, said vehicle control unit starts said internal combustion engine after controlling said relay such that the state of said electric power supply line switches from said interrupted state to said conducting state when said second condition is satisfied during startup of said vehicle, and said standby time is a period of time from a switch of the state of said electric power supply line to said conducting state to completion of starting said internal combustion engine.

3. The control device for a vehicle according to claim 1, further comprising a current detecting unit for detecting current in said electric power supply line, wherein said state of charge detecting unit determines that the state of said electric power supply line is switched by said relay to said conducting state when current detected by said current detecting unit exceeds a threshold value during startup of said vehicle.

4. The control device for a vehicle according to claim 1, wherein said relay is driven upon receipt of an instruction signal from said power supply interrupting unit, and said state of charge detecting unit determines that the state of said electric power supply line is switched by said relay to said conducting state when said instruction signal indicates putting the state of said electric power supply line into said conducting state during startup of said vehicle.

5. The control device for a vehicle according to claim 1, wherein said vehicle is provided with an operation unit for starting up a system of said vehicle, said vehicle control unit initiates a startup process of the system of said vehicle in response to an operation of said operation unit by a driver, and said state of charge detecting unit determines that the state of said electric power supply line is switched by said relay to said conducting state when determination time has elapsed since said vehicle control unit initiated said startup process.

6. The control device for a vehicle according to claim 1, wherein said vehicle is provided with an operation unit for starting up a system of said vehicle, said vehicle control unit initiates a startup process of the system of said vehicle in response to an operation of said operation unit by a driver, and said state of charge detecting unit determines that the state of said electric power supply line is switched by said relay to said conducting state when said startup process is completed.

* * * * *